United States Patent [19]

Duchêne

[11] 4,170,070

[45] Oct. 9, 1979

[54] METHOD AND DEVICE FOR CONTROLLING THE GEOMETRY OF TWO-WHEELED VEHICLES

[76] Inventor: René Duchêne, 4, rue Monge, 92800 Puteaux, France

[21] Appl. No.: 936,685

[22] Filed: Aug. 25, 1978

[30] Foreign Application Priority Data

Aug. 30, 1977 [FR] France .................................. 77 26283

[51] Int. Cl.² ............................................. G01B 5/255
[52] U.S. Cl. .................................................. 33/203.18
[58] Field of Search ............ 33/203.12, 203.16, 203.18

[56] References Cited

U.S. PATENT DOCUMENTS

| | | | |
|---|---|---|---|
| 2,160,226 | 5/1939 | Phillips | 33/203.18 X |
| 3,875,672 | 4/1975 | Castoe | 33/203.12 |

Primary Examiner—Charles E. Phillips

[57] ABSTRACT

This universal control method and device for checking the basic geometry of two-wheeled vehicles comprises two aligned pairs of clamping jaws adapted to receive and clamp the rims of the front and rear wheels, respectively, of the vehicle; one pair of jaws is adjustable in the longitudinal direction to suit the wheelbase of the specific vehicle being controlled. The jaws are adjustable transversely and symmetrically on either side of the longitudinal center line of the device, and the base frame of the device is provided with means for adjusting its horizontality. Graduated scales and verniers are provided for accurately positioning the vehicle by taking one wheel, in good condition, of the vehicle as reference.

11 Claims, 5 Drawing Figures

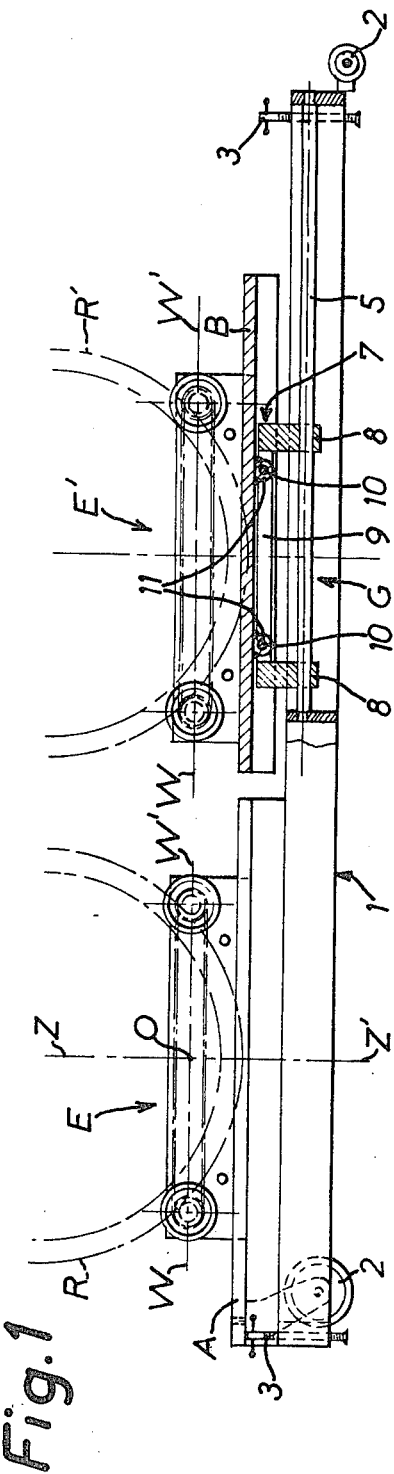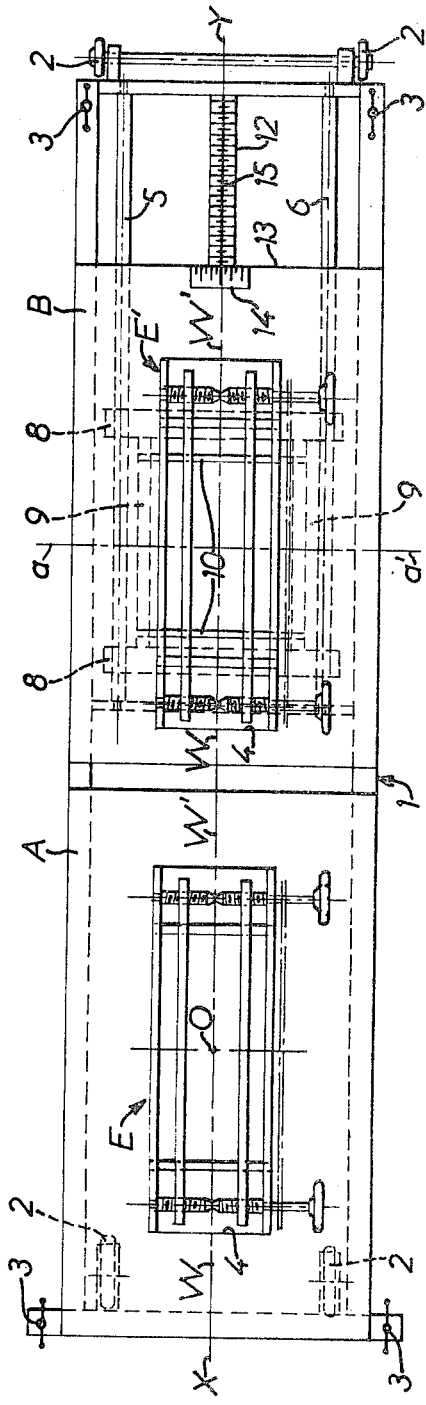

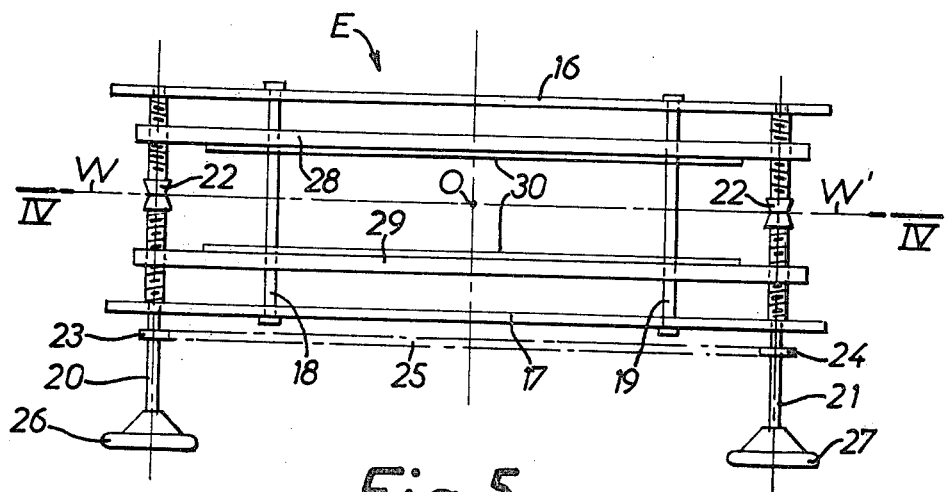
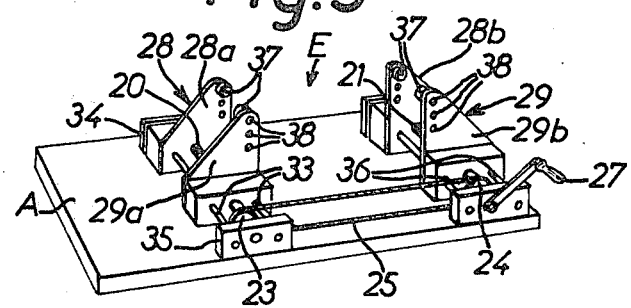
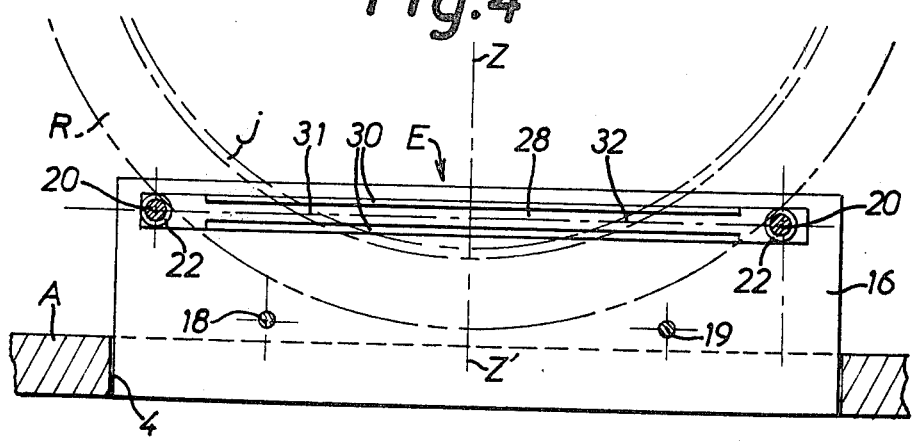

METHOD AND DEVICE FOR CONTROLLING THE GEOMETRY OF TWO-WHEELED VEHICLES

FIELD OF THE INVENTION

The present invention relates to a method of and a universal device for controlling the basic geometry of two-wheeled vehicles and is directed more particularly but not exclusively to the control of the basic geometry of motor-cycles and other two wheeled motor vehicles.

It is known that the two wheels of a motorcycle are normally aligned, i.e. substantially coplanar, when the handlebar of the motorcycle is in its straight-ahead position, that the wheels have a predetermined wheel-base for a given motorcycle, that the legs of the fork supporting the front wheel and the steering axis, which is also the pivot axis of the fork, are inclined from the vertical through an angle, called the rake angle, having also a predetermined value for a given motorcycle, and that the frame of a given motorcycle has predetermined dimensions set by the manufacturer. After a prolonged ride under severe conditions, for example on speedway or trial races, or after an accident, the wheel alignement must be checked carefully, together with the various geometrical parameters mentioned hereinabove, and the figures thus obtained must be compared with those specified by the manufacturer, so that proper repairs can be made. The main difficulty lies in controlling the wheel alignment, chiefly because in general the thickness of the rear wheel of a motorcycle differs from that of the front wheel.

DESCRIPTION OF THE PRIOR ART

Hitherto known control methods require a preliminary disassembling of at least one portion of the mechanisms of the two-wheeled vehicle by using control devices specially designed and constructed for the particular make and type of vehicle concerned. In addition, with these known control methods and means only an approximate knowledge of the distortions suffered by the vehicle after a prolonged use or an accident is obtained. Other known control devices rely on eye-sighting for determining the degree of distortions to be corrected.

DESCRIPTION OF THE INVENTION

It is the essential object of the present invention to provide improved control method and device for measuring with precision the misalignment, i.e. the transverse or lateral displacement, between the two wheels of a two-wheeled vehicle.

It is another object of this invention to provide a method of and a device for controlling all types of two-wheeled vehicles, irrespective of their manufacture.

A further object of this invention consists in providing a control method and a control device for controlling in a convenient, easy and accurate manner the basic geometric parameters of a two-wheeled vehicles, such as the wheelbase, the rake angle of the front fork and of the steering axis in relation to the vertical, the angle of inclination of the first wheel in relation to the plane of the rear wheel, and other dimensions possibly specified by the manufacturers of two wheeled vehicles.

For this purpose, the control method according to this invention is characterized in that it consists in utilizing a wheel in good condition of the two-wheeled vehicle to be checked, keeping said wheel in a predetermined plane and controlling the complete basic geometry of the vehicle by taking said wheel as a reference element.

Preferably, the rear wheel of the two-wheeled vehicle will be taken as reference element. It will be noted that if the front wheel is warped or otherwise damaged, for example as a consequence of an accident, it can be replaced by a new wheel or another similar wheel in good condition for controlling the vehicle.

The universal control device according to this invention is characterized in that it comprises a substantially horizontal elongated base frame, a first pair of movable jaws located in the vicinity of one end of the base frame and symmetrically on either side of a fixed vertical plane containing the longitudinal center line of the base frame, a first control device capable of moving simultaneously and to the same extent the two jaws of the first pair in mutually opposed directions and at right angles to said fixed vertical plane, a support mounted on said base frame near the opposite end thereof and movable in a direction perpendicular to said fixed vertical plane between a position aligned with the longitudinal axis of the base frame and end positions spaced transversely from said aligned position, another pair of movable jaws carried by said support and disposed symmetrically on either side of another vertical plane fixed in relation to said support and coincident with said fixed vertical plane when the support is in its aligned position, a second control device capable of moving simultaneously and to the same extent the two jaws of the second pair in mutually opposed directions and at right angles to said other vertical plane, one of said first and second pairs of jaws being also movable in relation to the base frame in a direction parallel to the longitudinal center line of the base frame, each first and second pairs of jaws being shaped to clamp the opposite edges of the rim of a wheel of the two-wheeled vehicle to be controlled at at least two pairs of longitudinally spaced points registering with each other, and a measuring assembly comprising an index and a graduated scale, one of which is carried by the support and the other by the base frame, for displaying the value of the transverse displacement between said fixed vertical plane and said other vertical plane, and consequently the transverse displacement between the two wheels of the vehicle to be controlled.

BRIEF DESCRIPTION OF THE DRAWINGS

FIG. 1 is a side elevational view of the control device of this invention, with parts broken away;

FIG. 2 is a plane view from above of the control device shown in FIG. 1;

FIG. 3 is a plane view showing on a larger scale one of the two clamping means of the control device of FIG. 1;

FIG. 4 is a section taken along the line W—W' of FIG. 3, and

FIG. 5 is a perspective view showing a modified form of embodiment of the clamping assembly of FIGS. 3 and 4.

DESCRITION OF THE PREFERRED EMBODIMENTS

The control device illustrated in FIGS. 1 and 2 of the drawing comprises a relatively shallow rectangular base frame 1 of a length sufficient to accomodate all existing and conventional two-wheel vehicles, notably motorcycles; this base frame is sturdy enough to bear the heaviest motorcycles.

This base frame 1 is carried by four wheels 2, by pair or all of the castor or fixed type, and these wheels are strong enough to permit two movements of the base frame 1 both under load and without load.

Four screw jacks 3 provided with control levers or any other known and suitable actuation means are disposed at the four corners of the base frame 1 e or off-set laterally to improve the stability of the frame 1 if necessary, and these jacks 3 are also useful for locking the frame against movement and positionning some horizontally for example by means of a air or spirit level.

A first tray A having a flat and rigid top surface in the static condition is secured to the base frame 1 near one end thereof, so that all measurements can be made by taking said top surface as a reference as customary in car chassis repair works.

An elongated rectangular aperture 4 is formed in the tray A, the longitudinal center line of this rectangular aperture being coincident with the longitudinal center line X Y of frame 1. The length of this aperture 4 is sufficient to accomodate therein a clamping assembly E to be described in detail presently. The longitudinal center line W W' of this clamping assembly E lies above the axis X Y and in the same fixed vertical plane containing said axis X Y.

The assembly E is adapted to receive one of the two wheels, preferably the rear wheel, of the two-wheeled vehicle (not shown) to be controlled, and to position and firmly hold the wheel R in proper alignment with the reference axis X Y at right angles to the tray A, i.e. in the vertical reference plane containing said reference axis X Y.

Another tray B having the same flatness and rigidity characteristics as tray A is mounted on the base frame 1 adjacent the opposite end thereof.

The upper or top surface of tray B is level with that of tray A and comprises a clamping assembly E' similar to the clamping assembly E and adapted to receive the other wheel R', for example the front wheel of the two-wheeled vehicle to be controlled.

The tray B carrying the clamping assembly E' is movable in relation to the frame 1 and to this end guide means G permitting horizontal movements of the tray B at right angles to each other are provided.

These guide means may consist of any known system permitting the linear movements of the tray B with the necessary precision.

Thus, the guide means G may comprise for example a pair of parallel guide bars 5 and 6 also parallel to the longitudinal center line X Y, the length of these guide bars 5, 6 being sufficient for accomodating all two-wheeled vehicles, from the smallest wheelbase to the largest wheelbase. These guide bars 5, 6 are rigid with the frame 1. A rectangular sub-frame 7 comprises on the one hand a pair of transverse end members 8 provided with bores slidably engaged by the corresponding guide bars 5, 6 and on the other hand a pair of longitudinal side members 9 fastened to the top of said transverse end members 8 and parallel to each other and to the longitudinal center line X Y. Furthermore, these longitudinal side members 9 have each formed therethrough a pair of transverse bores located at the same distance from the transverse center line a a' of frame 7 and engaged by the corresponding ends of a pair of fixed cross rods 10. A pair of hollow sockets 11 acting as guide bearings are secured to the lower surface of tray B and adapted to slide on cross rods 10 within the limits afforded by the abutment-forming side members 9.

With this arrangement, the tray B can be moved horizontally both in a direction parallel to the axis X Y and in a direction at right angles to this axis X Y. When the tray B is in a position centered to the axis X Y, the longitudinal center line of the clamping assembly E' is located in the vertical plane containing the axis X Y.

A rule 12 carrying a millimetric scale (or any other desired linear scale according to the countries concerned) is secured to the base frame 1; the reference point for a longitudinal linear measurement is the point 0 of intersection between the axis X Y and the vertical center line Z Z' of the clamping assembly E. A reference mark carried by the tray B gives a direct reading of the wheelbase value between the wheels R and R' of the vehicle. Thus, for instance, the reference mark may consist of the end edge 13 of tray B.

A graduated vernier 14 having the same graduation as that utilized for measuring the wheelbase value of the vehicle is carried by the tray B and, in conjunction with a reference mark or index consisting for instance of the longitudinal center line 15 of rule 12, affords a direct reading of the value of the transverse displacement between the longitudinal center line W W' of clamping assembly E' and the axis X Y, therefore the left-hand or right-hand displacement of the front wheel R' in relation to the rear wheel R of the vehicle.

When it is contemplated to measure the angle of inclination of the wheel R' from the vertical, the clamping assembly E' may be pivotally mounted on tray B by means of a horizontal shaft (not shown) parallel to the axis X Y, and the other clamping assembly E' may be associated with an angular protractor (not shown) giving a direct reading of the aforesaid angle and therefore of the angle formed between the plane of the front wheel R' and the plane of the rear wheel R.

The two clamping assemblies E and E' are identical with each other, therefore only one of them will now be described with reference to FIGS. 3 and 4 of the drawing.

The clamping assembly E shown in FIGS. 3 and 4 comprises a pair of vertical plates 16, 17 parallel to each other and to the axis W W', and equally spaced from said axis W W'. Both plates 16, 17 which, if desired, may consist of the two lateral wings of a U-sectioned member, are portially fitted in the aperture 4 of tray A (or B) and secured thereto at right angles to the top horizontal surface of the tray. In this connection it may be remainded that the longitudinal center line W W' of clamping assembly E lies in the vertical plane containing the longitudinal center line X Y of the base frame 1. The proper relative spacing of plates 16 and 17 is obtained by means of cross members or distance-pieces 18 and 19.

Two shafts 20 and 21 parallel to each other and to the top surface of tray A are rotatably mounted in corresponding bores formed through the plates 16 and 17, respectively.

These shafts 20 and 21 are also equally spaced from the point 0 which lies at the intersection of axis X Y (or W W') with the vertical axis Z Z' containing the center of wheel R and constituting the reference point for measuring the wheelbase or distance between the centers of the wheels R and R' of the two-wheeled vehicle to be controlled.

The shafts 20 and 21 comprise each, in an intermediate portion, between the plates 16 and 17, a capstan-shaped portion 22, i.e. an assembly of two frustoconical elements assembled by their minor bases. The cone angle of these capstan-shaped portions 22 corresponds roughly to the average slope of the profile of the tires normally equipping the two-wheeled vehicles to be controlled, and the common minor bases of these frustoconical portions lie on said axis W W'. This capstan-shaped portion 22 of each shaft 20, 21 is adapted to engage the tire of the wheel R (or R') of the two-wheeled vehicle to be controlled, so as to facilitate the proper positioning of this wheel R (or R') in relation to the axis X Y (or W W' of the clamping assembly E').

On either side of their capstan-shaped central portions 22 and from these portions to a point close to plates 16 and 17, the shafts 20 and 21 have screw-threaded portions of opposite pitch, for example a left-handed pitch on one side of axis W W' and a right-handed pitch on the other side of axis W W'.

The shafts 20 and 21 have extensions on one side, externally of plate 17, and carry chain pinions 23 and 24, respectively, rigid with the relevant shafts and operatively interconnected by a transmission chain 25. Control members such as hand-wheels 26 and 27 are secured to the outer ends of shafts 20 and 21. A pair of jaws 28 and 29 formed with tapped holes corresponding to the threads of shafts 20 and 21 are mounted on the threaded portions of said shafts between plates 16 and 17, and so adjusted that they can move in parallel and symmetrically in relation to the longitudinal center line W W' when the shafts 20 and 21 are driven for synchronous rotation by means of one or the other of the handwheels 26 and 27.

The inner surface of jaws 28, 29 is lined with a relatively hard material 30 (FIG. 4) substantially incompressible under relatively low loads but not liable to mark or damage the edges of the rim of wheel R when clamped therebetween.

It will be noted that the jaws 28 and 29 clamp the opposite sides of rim J at two areas 31 and 32 (FIG. 4) spaced along the axis W W', the contact points between the jaws 28, 29 and the rim J registering by pairs, in opposition, thus keeping the wheel R in the vertical plane containing the axis W W'.

In the example shown in FIGS. 3 and 4, the jaws 28 and 29 consist of flat horizontal horizontal strips parallel to each other and to the axis W W'. However, with this particular shape of jaws 28 and 29 the wheel rim J cannot be properly clamped. This may occur sometimes when the wheel R or R' is equipped with a disc brake of which the disc has a relatively great diameter. To avoid this inconvenience, the clamping assemblies E and E' may be constructed as illustrated in FIG. 5, wherein the component elements of the clamping assembly E which are unchanged or have the same function as those shown in FIGS. 3 and 4 are designated by the same reference numerals.

In FIG. 5, each jaw 28, 29 consists of a pair of vertical, substantially triangular plates 28a, 28b and 29a, 29b, respectively, each provided with a tapped hole corresponding to one of the threaded portions of shafts 20 and 21; the plates 28a and 29a are mounted in opposition to each other on shaft 20, and plates 28b and 29b are mounted in opposition to each other on shaft 21, respectively, and plates 28a and 28b are adjusted to be coplanar. The same applies to plates 29a and 29b. As in the preceding example, both jaws 28 and 29 are also so adjusted as to be equally spaced from the longitudinal center line (W W') of the clamping assembly E. During their movements, plates 28a and 29a are guided by a pair of guide rods 33 parallel to the threaded shaft 20 and supported at their ends by blocks 34 and 35 fastened to the tray A in which the shaft 20 is rotatably mounted. The movements of plates 28b and 29b are guided in a similar fashion by means of a pair of guide rods 36.

Each plate 28a, 28b, 29a, 29b carries on its inner face a contact stud 37 adapted to engage the corresponding edge of the rim of one of the two wheels of the vehicle to be controlled. The contact studs 37 are made of a relatively hard, incompressible material, like the linings 30 of FIG. 4, and furthermore they are so disposed as to register by pairs with each other. Preferably, these contact studs 37 are detachably secured to the relevant vertical plate 28a, 28b, 29a, or 29b. The four studs 37 are identical and selected among a range of sets of studs having different shapes consistent with the various shapes of existing wheel rims. In addition, and preferably the position of each stud 37 on the corresponding vertical plate is adjustable so that the clamping assembly E can be adapted to the various wheel diameters. To this end, each plate 28a, 28b is proided with a series of fastening holes 38 aligned with the holes 38 of the opposite plate 29a, 29b.

In other forms of embodiment, the synchronous rotational movements of shafts 20 and 21 may be obtained by means of any other known and suitable mechnnisms or devices, and the means for actuating these mechanisms and devices may also be of any suitable and known type.

The possibility of moving the jaws 28 and 29 towards and away from each other to the same extent in order to keep the distance between these jaws and the longitudinal center line W W' at the same value is necessary because the width of the rims of motorcycles wheels is in all cases greater at the rear wheel than at the front wheel, and in addition the longitudinal center line of the vehicle to be controlled must lie in the vertical plane containing the reference longitudinal center line X Y of base frame 1.

It will also be noted that one portion of the base frame 1 which extends between the two trays A and B, therefore between the wheels R and R', remains free and can be used for receiving jacks or blocks for lifting the motorcycle to be controlled by engaging the frame or the lower portion of the engine thereof. By pivoting the vehicle about the axis of the rear wheel R, retained between the jaws of the clamping assembly E, the front wheel R' can be lifted sufficiently to permit the disassembling of the front fork and then check the dimensions at the fork node, so that when the frame of the vehicle has resumed its horizontal position, the reverse operations can be performed.

In the above described control device, the tray B is mounted for movement both parallel to and across the longitudinal center line X Y. However, if desired the movable tray B may be mounted for movement only at right angles to the axis X Y and the other tray A may be mounted for movement in a direction parallel to said axis X Y, instead of being rigid with the base frame 1 of the control device. In this case, the graduated rule 12 will be associated with an index or reference mark carried by tray Z for measuring the wheelbase or distance between centers of wheels R and R'.

From the foregoing, those skilled in the art will readily understand the mode of operation of the control device of this invention; therefore, it is not deemed necessary to give a detailed description of this mode of operation.

What is claimed is:

1. A universal device for controlling the basic geometry of two-wheeled vehicles, comprising a substantially horizontal elongated base frame, a first pair of movable jaws disposed in the vicinity of one end of said base frame and located symmetrically on either side of a fixed vertical plane containing the longitudinal center line of said base frame, a first control device capable of moving simultaneously and to the same extent the two jaws of said first pair of mutually opposed directions perpendicular to said fixed vertical plane, a support mounted on said base frame near the opposite end thereof and movable in a direction perpendicular to said fixed vertical plane between a position aligned with the longitudinal axis of the base frame and end positions spaced transversely from said aligned position, a second pair of movable jaws carried by said support, the jaws of said second pair being disposed symmetrically on either side of another vertical plane fixed in relation to said support and coincident with said fixed vertical plane when said support is in its aligned position, a second control device capable of moving simultaneously and to the same extent the two jaws of said second pair in mutually opposed directions perpendicular to said other vertical plane, one of said first and second pair of jaws being also movable in relation to said base frame in a direction parallel to the longitudinal axis of said base frame, each one of said first and second pairs of jaws being shaped to clamp the opposite edges of the rim of one wheel of a two-wheeled vehicle to be controlled at at least two pairs of longitudinally spaced and mutually registering points, and a measuring assembly consisting of an index and of a graduated scale, of which one is carried by said support and the other by said base frame, for displaying the value of the transverse displacement between said fixed vertical plane and said other vertical plane, and consequently the transverse displacement between the two wheels of the vehicle to be controlled.

2. A universal control device as claimed in claim 1, wherein a second measuring assembly comprising another index and another graduated scale, of which one is carried by said base frame and the other is movable with the pair of jaws movable parallel to the longitudinal axis of the base frame, is provided for displaying the value of the displacement between the two pairs of jaws and consequently the value of the wheelbase of the vehicle to be controlled.

3. A universal control device as claimed in claim 2, wherein said support consists of a first horizontal tray movable in relation to the base frame both in a direction perpendicular to said fixed vertical plane and in a direction parallel to the longitudinal axis of the base frame.

4. A universal control device as claimed in claim 3, wherein said first pair of jaws and said first control device are carried by another horizontal tray secured to said base frame and having its top surface level with that of said first tray.

5. A universal control device as claimed in claim 4, wherein said base frame is provided with four screw jacks for adjusting the horizontality of the two trays.

6. A universal control device as claimed in claim 4, wherein each one of said first and second control devices comprise two shafts rotatably mounted and parallel to the top surface of one of said trays and extending at right angles to said fixed vertical plane, each shaft comprising two screw-threaded portions having opposed pitches engaged in corresponding tapped holes formed in the jaws of one of said first and second pairs, at least one of said shafts being provided at one end with a control member for rotating the corresponding shaft, means being also provided for synchronizing the rotation of said two rotary shafts.

7. A universal control device as claimed in claim 6, wherein each jaw of said first and second pairs consists of a flat horizontal strip parallel to said fixed vertical plane and provided on one side of a lining of relatively hard material substantially incompressible under low load conditions, adapted to engage one edge of the rim of one of the wheels of the two-wheeled vehicle to be controlled, said strip being provided with two tapped holes engageable by the corresponding screw-threaded portions of said rotary shafts.

8. A universal control device as claimed in claim 6, wherein each jaw of said first and second pairs consists of a pair of vertical coplanar plates parallel to said fixed vertical plane, each vertical plate being provided on one side with a contact stud of relatively hard material substantially incompressible under low load conditions, adapted to engage one edge of the rim of one of the two wheels of the vehicle to be controlled, each plate having formed therethrough a tapped hole engageable by a corresponding screw-threaded portion of one of said pair of rotary shafts.

9. A universal control device as claimed in claim 8, wherein each contact stud is detachably fastened to the vertical plate of the corresponding jaw and selected among a range of sets of contact studs having different shapes consistent with the various contours of existing wheel rims.

10. A universal control device as claimed in claim 9, wherein the position of each contact stud on the corresponding vertical plane is adjustable.

11. A universal control device as claimed in claim 1, wherein said support consists of a first horizontal tray movable in relation to the base frame both in a direction perpendicular to said fixed vertical plane and in a direction parallel to the longitudinal axis of the base frame.

* * * * *